Patented Oct. 22, 1946

2,409,683

UNITED STATES PATENT OFFICE 2,409,683

POLISH COMPOSITIONS

Benjamin Wilson Howk, John Richard Roland, and Harvey Herbert Hoehn, Wilmington, Del., assignors to E. I. du Pont de Nemours & Company, Wilmington, Del., a corporation of Delaware No Drawing. Application May 4, 1943, Serial No. 485,644

14 Claims. (Cl. 106—10)

This invention relates to new wax compositions and more particularly to new wax compositions used as polishes.

Present day high quality automobile, floor and shoe polishes comprise dispersions of carnauba wax and soft-wax plasticizers in either high boiling hydrocarbon media, as in solvent-type polishes, or in aqueous medium, as in the water-emulsion type. The erratic and increasing price of carnauba wax, together with the widespread demand for this imported wax, has led to an extensive search for new, readily available, low cost waxes. Chief attention has been centered on replacement of carnauba wax in polishes with closely related natural products such as candelilla, monten, ouricoury, and beeswax. Replacement of carnauba with these waxes is accomplished only after considerable modification of the polish formulas and through sacrifiice in the polishing and wearing properties of the products. In addition, montan and ouricoury wax, like carnauba, are not available in this country and must be imported. Furthermore, natural waxes differ widely in quality and require extensive grading, testing, and blending prior to commercial consumption. Past attempts to replace carnauba with synthetic waxes have resulted in polishes with inferior properties.

An object of the present invention is to provide high quality polish compositions based on new synthetic waxes comprising telomers of ethylene with oxygenated organic compounds. A further object is to provide paste polishes of the solvent-wax type. Another object is to provide liquid polishes. Still another object is to provide polishes of the water-emulsion type. Other objects will be apparent from the description of the invention.

The invention comprises new wax compositions suitable as polishes wherein telomers of ethylene with oxygenated organic compounds and other ingredients of polish compositions are dispersed in inert liquids. The telomers have preferably molecular weights ranging from about 500 to about 10,000, based on intrinsic viscosity data, although telomers having much higher and somewhat lower molecular weights may be used.

The novelty of the synthetic waxes employed in this invention and of the reaction by which they are formed is such that for a clear understanding a new set of terms has been coined. The reaction has been called "telomerization" (from the Greek telos meaning "end" plus the Greek mer meaning "part"). Telomerization is defined as the process of reacting, under polymerization conditions, a molecule YZ, which is called a "telogen," with more than one unit of a polymerizable compound having ethylenic unsaturation, called a "taxogen," to form products called "telomers," having a new carbon to carbon bond and the formula $Y(A)_nZ$, wherein $(A)_n$ is a divalent radical formed from a plurality of taxogen molecules, the unit A being called a "taxomon," $n$ being an integer greater than 1, and Y and Z being fragments of the telogen attached terminally to the chain of taxomons.

Telomerization is not to be confused with interpolymerization. It is known, for example, that, under conditions similar to those described above, ethylene can be interpolymerized with a wide variety of unsaturated compounds. In such interpolymerizations a plurality of molecules of each reactant, the ethylene and the unsaturated compound, enter into the formation of every molecule chain, and the resulting product is a high molecular weight polymeric material containing recurring units of each species of reactant. In telomerization reactions, however, substantially one molecule of the telogen enters into the reaction with the growing polymer chain, and the average molecular weight of the product is very much lower than that of an interpolymer or polymer formed under similar conditions.

The new synthetic waxes employed herein are telomers of ethylene with saturated organic compounds containing only carbon, hydrogen, and oxygen. The saturated organic compound used as telogen may be an alcohol, aldehyde, ketone, acid, ester, orthoester, acid anhydride, ether or acetal. A more detailed description of these telomers and their preparation is given in copending applications of William E. Hanford et al. and M. D. Peterson et al., respectively, filed January 1, 1943, Serial Numbers 471,028 and 471,058, the latter having matured into Patent No. 2,395,292, February 19, 1946.

The objects of this invention are accomplished by dispersing an ethylene telomer along with the necessary modifying agents in an inert solvent. The method of polish preparation and the modifying agents and solvents to be employed depend on the type of polish composition desired. For example, paste polishes are obtained by dissolving a mixture of an ethylene telomer and a soft wax, such as paraffin or beeswax, in a hot hydrocarbon solvent, and then allowing the hot solution to cool in such a manner that a firm, smooth paste is obtained. Adjuvants such as coloring agents and odorants may be added to the hot solution.

Liquid polishes of the solvent-wax type are prepared in a like manner and differ from the paste type of polish chiefly in the amount and volatility of the hydrocarbon solvent used.

The water emulsion-wax types of polish composition are prepared by dispersing an ethylene telomer, with or without soft waxes, dyes, odorants, etc., in an aqueous medium with the aid of suitable dispersing agents and agitation until a homogeneous stable wax-in-water suspension is obtained.

The following examples, in which parts are given by weight, more fully illustrate the practice of this invention.

*Example 1.*—A mixture of 7.5 parts of an ethylene/1,3-dioxolane telomer, 5.5 parts of paraffin wax and 35.5 parts of mineral spirits (B. P. 150 to 215° C.) is heated at 110 to 125° C. in a suitable vessel until the waxes dissolve. Sufficient oil soluble orange dye is then added to the clear solution to color it a bright orange and the colored solution is cooled slowly with stirring until the temperature reaches 87° C. The material is then poured into a suitable container and allowed to cool and harden. The solidification of the cream may be accelerated by cooling with a current of air directed over the surface. The product obtained is a paste polish which is extremely useful as an automobile polish. It possesses a firm smooth gel structure which exhibits no sweating or separation of solvent on storage. Furthermore, the product is free from such irregularities as "graininess" (the presence of small wax particles) and is uniform in texture, so that there is no concentration of the hard wax near the bottom of the container as is the case in many commercial compositions. The polish is easily applied to give a smooth, even wax film which may be buffed to a hard, lustrous and smear-resistant finish.

*Example 2.*—A high quality floor paste polish is prepared by the following procedure. A mixture of 12.5 parts of an ethylene/1,3-dioxolane telomer, 8.8 parts of paraffin wax (M. P. 57° C.), 3.8 parts of petroleum wax (M. P. 68° C.), 74 parts of mineral spirits, 1 part citrex and 0.01 part of oil soluble orange dye is heated in a suitable vessel at 110 to 125° C. until the waxes are dissolved. The resulting clear solution is allowed to cool to 88° C. with slow stirring. At this temperature the composition begins to solidify and is then poured from the kettle into containers to cool and harden. Solidification may be accelerated by cooling the mass with a draft of air directed over the surface. There is then obtained a floor paste polish having a firm, smooth gel structure which does not exude solvent and is free from "graininess." It is easily applied to floors and gives a smooth, even wax film which is readily buffed to a smear-resistant, glossy finish.

*Example 3.*—A mixture of 12.5 parts of ethylene/1,3-dioxolane telomer, 8.8 parts of paraffin wax (M. P. 57° C.) and 3.8 parts of petroleum wax (M. P. 68° C.) is heated in a mixing kettle until a clear liquid melt is obtained. Two and nine-tenths parts of a spirit-soluble black dye and 78 parts of turpentine are added to the melt. The mixture is then heated until the waxes dissolve and the hot solution allowed to cool to 92° C. while being slowly stirred. The composition is then poured into suitable containers to cool and solidify. There is thus obtained a black paste polish for leather having a firm, smooth gel structure with excellent solvent retention properties. It can be applied easily as an even, smooth film and readily buffs to a flossy, mirror-like finish.

*Example 4.*—A mixture of 7.5 parts of an ethylene/methyl propionate telomer, 5.5 parts of paraffin wax, and 35.5 parts of mineral spirits is heated until a clear solution is formed. This solution is allowed to cool gradually with slow stirring until the temperature reaches 90° C. The mixture is then poured into cans to cool and solidify. The paste thus obtained possesses a firm, smooth gel structure with excellent solvent retention properties. It is very useful as a neutral shoe polish and spreads readily to give a smooth, continuous film which is easily buffed to a durable glossy finish.

*Example 5.*—Replacement of the ethylene/methyl propionate telomer in the above example with an ethylene/diethyl ether telomer results in the formation of an automobile paste polish of excellent properties.

*Example 6.*—A mixture of 10 parts of ethylene/methyl propionate telomer and 10 parts of beeswax is heated with 80 parts of turpentine, blue Nigrosine dye is added with stirring and the solution then allowed to cool to 80° C. with slow stirring. The composition is poured into containers to cool and solidify. There is thus obtained a shoe polish having a firm, smooth, cream-like texture which exhibits excellent solvent retention properties. The paste spreads easily to give smooth, even films which are readily buffed to smear-resistant finishes of high luster.

*Example 7.*—A representative liquid polish of the solvent-wax type may be prepared as follows: A mixture of 7.5 parts of ethylene/methyl propionate telomer and 5.5 parts of paraffin wax is heated with 187 parts of a solvent blend consisting of 168 parts of V. M. P. naphtha, a petroleum fraction composed of aliphatic hydrocarbons and having a distillation range of 100° to 167° C., and 19 parts of tetrachloroethylene until a clear solution results. This solution is cooled somewhat while being slowly stirred and then poured into suitable containers. The product thus obtained is easy to apply and gives wax films which dry readily and are buffed without much effort to hard, glossy finishes.

*Example 8.*—The emulsification of the ethylene telomer waxes to produce polishes of the aqueous self-lustering wax emulsion type may be accomplished by a variety of procedures already described in the art. For instance, one method which may be employed is as follows: A mixture consisting of 15 parts of ethylene/1,3-dioxolane telomer wax, 3 parts of triethanolamine oleate, and 82 parts of water is placed in a shaker tube or any other vessel equipped with a suitable means of agitation such as stirring. The mixture is then shaken at 125° C. for about an hour. Heating is then discontinued and the tube allowed to cool with shaking. The wax emulsion which results may then be stabilized by the addition of suitable gums or resins. When applied to floors, the wax emulsion gives a lustrous and durable finish.

*Example 9.*—A mixture of 7.5 parts of an ethylene/methyl tetramethyl glucoside telomer, 5.5 parts of paraffin wax (M. P. 46° to 52° C.), and 35.5 parts of mineral spirits (B. P. 150° to 215° C.) is heated in a suitable vessel to 110° C. until the mixture is homogeneous. The material is then poured into a suitable container, cooled and hardened. A current of cold air is blown over the surface of the material to aid solidification. The paste thus obtained possesses a firm gel structure and is suitable as a protective coating for leather, wood, and metal surfaces.

Replacement of the ethylene/methyl tetramethyl glucoside telomer in the above example with an ethylene/acetone telomer yields a composition having similar properties.

As indicated heretofore this invention relates to polish compositions prepared from telomers of ethylene with saturated organic compounds containing only carbon, hydrogen and oxygen. It is believed that these telomers have the structure $H(C_2H_4)nR$, wherein H is abstracted from the telogen and R is the residue of said telogen. Whether this structure is correct in all details is not entirely certain but it may be shown that these products contain chemically bound fragments of the telogen and the functional groups of these fragments can be determined by standard analytical methods. In this respect particularly and in physical properties generally, the telomers used in this invention differ from mere low molecular weight polymers of ethylene. Regardless of their structure, the telomers employed in this invention are characterized by excellent hardness, high melting point, compatibility with paraffin wax and other soft waxes, and ability to form firm smooth gels with typical polish solvents.

The telogens employed as reaction media and as reactants in the production of the ethylene telomers used in the present invention are organic compounds containing only carbon, hydrogen, and oxygen and which are free of olefinic unsaturation. Suitable classes of this type of telogen are saturated alcohols, ethers, acids, esters, orthoesters, anhydrides, aldehydes, ketones and acetals. Preferred compounds for use as telogens in the preparation of the ethylene telomers used in this invention can be represented by the formula ROR', wherein R and R' are free of olefinic unsaturation, may be alike or different, and may be alkyl, aryl, aralkyl, alkaryl, acyl, or the group

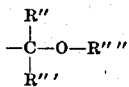

in which R'', R''', and R'''' are free of olefinic unsaturation, may be alike or different, may be alkyl, aryl, aralkyl, or alkaryl, and R'' and R''' may be hydrogen. Preferred classes of compounds coming within the scope of this formula are ethers, esters, anhydrides, and acetals. Acetal is used in its broadest sense and includes the subgroups of formal and of ketal.

In addition to the telomers disclosed in the foregoing examples other telomers of ethylene with saturated organic compounds of the classes described above may be used in this invention. Suitable examples of these compounds include ethyl orthoformate, methyl methoxyacetate, sec.-butyl acetate, ethyl propionate, methyl n-butyrate, methyl isobutyrate, acetoacetic ester, diethyl malonate, dimethyl adipate, glycol dipropionate, tripropionin, propionic anhydride, diethyl tartrate acetal, diethyl mucate bis(cyclohexanone) ketal, ethylene glycol monomethyl ether acetal, ethylene glycol monomethyl ether formal, ethylal, acetal, ketal of cyclohexanone and ethylene glycol, dibutyl ether, pentamethylene oxide, tetrahydrofurane, 1,3,5-trioxane, 2-methyl-1,3-dioxolane, 4-methyl-1,3-dioxolane, methylene glycerol, etc. The preferred telomers for use in the practice of this invention are those obtained from ethylene and 1,3-dioxolane and which have molecular weights, as calculated from intrinsic viscosity measurements, in the range of 1600 to 4400.

The telomerization reaction is preferably conducted at temperatures between 50 and 300° C. under pressures in excess of atmospheric and generally between 20 and 1000 atmospheres and is catalyzed with suitable catalysts such for example as oxygen, benzoyl peroxide, diethyl peroxide and like catalysts.

The telomers employed in this invention are characterized by unique wax-like appearance and melting behavior. They show good solubility at elevated temperature in typical polish solvents, and are compatible with paraffin and other waxes over wide ranges of composition. They have high retention of solvent especially wax solvent; they are extremely hard and form a continuous hard film without smearing or sticking, especially when laid down from a solvent gel. A paste or liquid solvent wax polish is generally composed of a blend of waxes so dissolved in a solvent or combination of solvents as to produce a composition of the requisite hardness or viscosity which when applied to a dull surface will give a hard and lustrous finish after proper buffing or polishing. Such a product must be free of such irregularities as "graininess," (the presence of small hard particles), in the case of the paste polishes and separation in the case of liquid wax polishes.

According to the preferred embodiments of the invention, paste polishes are prepared by dissolving a suitable mixture of an ethylene telomer of the type described above and soft wax in a proper solvent or combination of solvents at elevated temperatures and then transferring this hot solution to containers to cool and solidify. Coloring agents and odorants may be added to the hot solution prior to its transfer. The temperature of the wax solution at the time of its transfer from the mixing kettle plays an important role in the nature of the finished paste polish. A paste with optimum texture, hardness and solvent retention is obtained when the temperature at which the hot solution is poured approximates the temperature at which the ethylene telomer employed separates out of solution in the solvent or combination of solvents used. This value may be pre-determined by cooling down a slowly stirred hot solution of the polish ingredients and observing the temperature at which the solution becomes cloudy or begins to solidify on the walls of the vessel. This "cloud point" will, of course, vary and will depend on the ethylene telomer used, the concentration of the telomer and the solvent. In general, the cloud point will be in the range of 60° to 95° C. Another procedure which may be employed for preparing paste polishes involves heating together the ethylene telomer and soft wax until a clear melt is obtained and then slowly pouring this hot melt into a solvent containing the other polish ingredients. By means of a blend of the proper amount of the different waxes and proper temperature control, a composition can be obtained which may be transferred almost immediately.

It is often beneficial to accelerate the rate of cooling of the polish compositions in the containers as this further aids in securing paste polishes possessing the requisite hardness, smoothness of texture and solvent retention. Care must be taken to prevent too rapid cooling of the compositions since this may result in polishes in which the harder, higher melting ethylene telomers are concentrated at the bottom and the top layers consist chiefly of the soft wax. A convenient method for accelerating the cooling of the wax solution consists of directing a current of air across the surface of the solutions.

Liquid polishes of the solvent-wax type are prepared in a similar fashion and differ from the paste polishes in the amount and volatility of the solvent employed.

As can be seen from the foregoing examples the paste and liquid wax polishes contain soft waxes in addition to ethylene telomers. The soft waxes which may be employed include beeswax, ceresin and paraffin. The soft waxes serve to plasticize the hard telomers, thus imparting good spreading and polishing characteristics, and also act as inexpensive fillers. For most types of polishes, paraffin wax is to be preferred in view of its low cost and availability. However, in polishes designed for use as leather dressings; the crystalline, brittle nature of paraffin wax may be objectionable. In this case, the paraffin wax may be replaced in part or entirely by beeswax and/or ceresin.

A progressive decrease in the ethylene telomer/soft wax ratio in the polish composition results in a corresponding decrease in the hardness and melting point of the film of the final polishes obtained. For automobile and floor polishes the wax film desired should be hard and high melting whereas polishes for furniture, woodwork and shoes should be more plastic and softer. Accordingly the ratio of ethylene telomer to soft wax employed will depend on the type of polish composition desired and may vary from 5:1 to 1:5 in the polish. One outstanding property of these novel ethylene telomer waxes is their remarkable capacity to tolerate large amounts of the inexpensive soft waxes in wax polish compositions without sacrifice in desirable working and wearing properties.

The choice of the proper solvent or solvents to be employed in the polish compositions will depend to a great measure on the type of polish desired and also on the use for which the polish is intended. Thus, relatively high boiling solvents such as mineral spirits, naphtha, kerosene, turpentine, and nitrobenzene are best suited for paste polishes while a low boiling naphtha is best for liquid polishes. Generally, mineral spirits, an aliphatic hydrocarbon fraction with a boiling range of 140–220° C., is the preferred solvent for most paste polishes. However, in the case of shoe polishes it is preferred to use turpentine. It may be advantageous in some instances to add small quantities of less volatile solvents to decrease the entire evaporation rate and allow more uniform polishing. While hydrocarbons are the preferred solvents, other solvents such as alcohols, esters, ethers, ketones, and chlorinated hydrocarbons may be employed provided these solvents do not have deleterious effects on the finish of the surface to be polished.

The concentration of solvent in the polish composition will depend more or less on whether it is desired to prepare a paste or liquid wax type of polish. Liquid polishes invariably contain much larger proportions of solvent than paste polishes. Even in paste polishes the proper proportion of solvent will depend upon such factors as the ethylene telomer/soft wax ratio and the hardness and polishing characteristics desired in the final product. For economic reasons, the concentration of solvent used is the highest proportion which can be employed consistent with good polish properties. An outstanding characteristic of the telomers used in the practice of this invention is their ability to form firm, smooth gels containing large amounts of typical polish solvents, even when modified with large amounts of paraffin wax and other waxes commonly used in paste polish compositions.

The polish compositions may be colored by the addition of oil and spirit-soluble dyes. Only small concentrations of the dyes are necessary to secure polishes of the desired shades.

It may be advantageous in some cases to add odorants to the polish composition. Citrene is preferred for use in furniture polishes while trichlorobenzene may be added to shoe polishes to give the characteristic odor associated with these polishes.

Water emulsion wax polishes comprise dispersions of waxes in aqueous media. Water emulsion polishes based on ethylene telomer waxes may be prepared according to the various methods already disclosed in the art. For example, an aqueous emulsion of the ethylene telomer wax may be prepared by dissolving the wax in a high-boiling, water-immiscible solvent, dispersing this wax solution in water, and then removing the solvent by steam distillation. It is preferred, however, to prepare the wax emulsion by direct dispersion of the ethylene telomer in water using either a grinding or stirring technique. The temperature at which the dispersion is carried out will depend upon the technique followed. Room temperatures are best suited for grinding methods, whereas temperatures above the melting point of the telomer waxes; approximately 120° C., are necessary when the dispersions are made by rapid stirring.

The dispersion of the telomer waxes is carried out with the aid of cationic anionic and/or nonionic dispersing agents. The type of dispersing agent employed will depend on the degree of water resistance or other characteristics desired in the polish film. Thus, dispersing agents, in situ, by the reaction of high molecular weight fatty acids with volatile amines, are preferred when a lustrous, water-resistant coating is desired. The amount of dispersing agent used will vary according to the nature and effectiveness of the dispersants. It will also be dependent somewhat on the temperature and method of dispersion employed. The exact amounts can best be determined by actual tests.

The concentration of the telomer wax in the final emulsion may vary from 5 to 20%. Much lower wax concentrations, say down to about 2%, can be used but the polish thus produced is very dilute. Emulsions containing about 10% ethylene telomer wax are well suited for most polish uses.

The wax emulsion may also contain a gum or resin solution soluble in water, in an alkaline solution or organic solvents, the gum or resin solution being also dispersed in the wax emulsion and characterized by the property of being incapable of breaking the emulsion. Shellac, rosin, ester gum, copals, wax-soluble phenol-formaldehyde resins, etc. are some examples of the natural and synthetic gums or resins which may be added.

The polish compositions prepared from ethylene telomers are suitable for use in polishing automobiles, furniture, floors, woodwork, linoleum, metal office equipment, shoes and boots, leather goods, marble, and chrome- and nickel-plated objects. The relatively high degree of insolubility of the ethylene telomer waxes makes it possible to obtain wax films which are quite resistant to water, alcohols, and cold solvents in general. The ethylene telomer waxes, besides possessing exceptional wax properties and being low cost, are synthetic in nature and hence, uniform grades of waxes may be obtained which can be used directly without being sorted, graded, bleached, and blended as so often is necessary with carnauba and other natural waxes.

We claim:

1. A polish composition comprising approximately 7.5 parts of an ethylene/1,3-dioxolane wax-like reaction product obtained by polymerizing ethylene and 1,3-dioxolane at a temperature between 50 and 300° C. and a pressure above 20 atmospheres in the presence of a catalyst selected from the group consisting of oxygen and peroxy compounds; approximately, in parts by weight, 5.5 parts of paraffin wax; and mineral spirits in sufficient amount to give a firm smooth gel structure.

2. A polish composition consisting essentially of from, in parts by weight, 5 to 20 parts of a synthetic wax obtained by the interaction of ethylene with 1,3-dioxolane at temperatures from about 50° C. to approximately 300° C. and at pressures above 20 atmospheres and in the presence of a catalyst selected from the group consisting of oxygen and peroxy catalysts, from 1 to 5 parts of a soft wax per part of the synthetic wax and mineral spirits in sufficient amount to give a firm, smooth, gel structure.

3. A polish composition comprising an ethylene/methyl propionate synthetic wax-like reaction product obtained by the interaction of ethylene with methyl propionate at a temperature of about 50° C. to 300° C. and at a pressure above 20 atmospheres in the presence of a catalyst selected from the group consisting of oxygen and peroxy compounds and paraffin wax in a ratio of from 1 to 5 to 5 to 1 parts, there being present from 2 to 20% of the synthetic wax in the polish, the remaining 98 to 80% being paraffin wax and a diluent for the waxes, parts and percentages being by weight.

4. A polish composition comprising a synthetic wax obtained by the interaction of ethylene with an organic compound represented by the formula ROR' wherein R and R' are free of olefinic unsaturation and are selected from substituents of group consisting of alkyl, aryl, aralkyl, alkaryl, acyl and the substituent

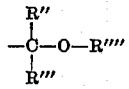

in which R'', R''', and R'''' are free of olefinic unsaturation and are selected from the group consisting of alkyl, aryl, aralkyl and alkaryl the R'' and R''' group including hydrogen, the interaction being effected at a temperature between 50 and approximately 300° C. under pressures above 20 atmospheres and in the presence of a catalyst selected from the group consisting of peroxy catalysts and oxygen, there being present in the polish in parts by weight from 1 to 5 parts of said synthetic wax to from 5 to 1 parts of a soft wax.

5. The polish of claim 4, containing a normally liquid hydrocarbon dispersing agent in sufficient amount to give a firm, smooth, gel structure.

6. The polish of claim 4, in the form of an aqueous dispersion.

7. A polish composition comprising a synthetic wax, obtained by the interaction of ethylene with 1,3-dioxolane at a temperature from about 50° C. to about 300° C. and at a pressure above 20 atmospheres and in the presence of a catalyst selected from the group consisting of oxygen and peroxy compounds, and a soft wax, there being present in the polish from, in parts by weight, 1 to 5 parts of the synthetic wax to 5 to 1 parts of the wax.

8. The polish of claim 7 containing a normally liquid hydrocarbon dispersing agent in sufficient amount to give a firm, smooth, gel structure.

9. The polish of claim 7 in the form of an aqueous dispersion.

10. A polish composition comprising a synthetic wax, obtained by the interaction of ethylene with methyl propionate at a temperature from about 50° C. to about 300° C. and at a pressure above 20 atmospheres and in the presence of a catalyst selected from the group consisting of oxygen and peroxy compounds, and a soft wax, there being present in the polish from, in parts by weight, 1 to 5 parts of the synthetic wax to 5 to 1 parts of the wax.

11. The polish of claim 10 containing a normally liquid hydrocarbon dispersing agent in sufficient amount to give a firm, smooth, gel structure.

12. The polish of claim 10 in the form of an aqueous dispersion.

13. A polish composition comprising approximately, in parts by weight, 7.5 parts of ethylene/methyl propionate wax-like reaction product, obtained by polymerizing ethylene and methyl propionate at a temperature between 50 and 300° C. and a pressure above 20 atmospheres in the presence of a catalyst selected from the group consisting of oxygen and peroxy compounds, approximately 5.5 parts of paraffin wax, and mineral spirits in sufficient amount to give a firm, smooth, gel structure.

14. A polish composition comprising an ethylene/1,3-dioxolane synthetic wax-like reaction product, obtained by polymerizing ethylene and 1,3-dioxolane at a temperature between 50 and 300° C. and a pressure above 20 atmospheres in the presence of a catalyst selected from the group consisting of oxygen and peroxy compounds, and paraffin wax in a ratio of from 1 to 5 to 5 to 1 there being present from 2 to 20% of the synthetic wax in the polish, the remaining 98 to 80% being paraffin wax and a diluent of the waxes, in sufficient amount to give a firm, smooth, gel structure, parts and percentages being by weight.

BENJAMIN WILSON HOWK.
JOHN RICHARD ROLAND.
HARVEY HERBERT HOEHN.

Certificate of Correction

Patent No. 2,409,683.                                          October 22, 1946.

BENJAMIN WILLIAM HOWK ET AL.

It is hereby certified that error appears in the printed specification of the above numbered patent requiring correction as follows: Column 8, line 45, after the word "agents" and before the comma insert *prepared*; and that the said Letters Patent should be read with this correction therein that the same may conform to the record of the case in the Patent Office.

Signed and sealed this 31st day of December, A. D. 1946.

[SEAL]

LESLIE FRAZER,
*First Assistant Commissioner of Patents.*